United States Patent [19]
Seith

[11] Patent Number: 5,162,794
[45] Date of Patent: Nov. 10, 1992

[54] SAFE TRAILING DISTANCE WARNING FOR VEHICLES

[76] Inventor: Nancy Seith, 8800 Carmichael Dr., Chester Township, Ohio 44026

[21] Appl. No.: 439,698

[22] Filed: Nov. 21, 1989

[51] Int. Cl.⁵ ............................................. G08G 1/16
[52] U.S. Cl. ................................... 340/903; 340/435; 340/436
[58] Field of Search ..................... 340/435, 436, 903

[56] References Cited

U.S. PATENT DOCUMENTS

| | | | |
|---|---|---|---|
| 3,026,498 | 3/1962 | Galliers | 340/435 |
| 3,192,437 | 6/1965 | Meyer | 340/903 |
| 3,533,061 | 10/1970 | Treiterer | 340/435 |
| 3,771,123 | 11/1973 | Lanes | 340/435 |
| 3,892,483 | 7/1975 | Saufferer | 340/903 |
| 3,949,362 | 4/1976 | Doyle et al. | 340/435 |
| 4,031,510 | 6/1977 | King | 340/62 |
| 4,063,237 | 12/1977 | Nier et al. | 343/7 |
| 4,084,149 | 4/1978 | Driver et al. | 340/1 R |
| 4,692,764 | 9/1987 | Bonar | 342/71 |
| 4,694,295 | 9/1987 | Miller et al. | 340/903 |
| 4,694,296 | 9/1987 | Sasaki et al. | 340/903 |
| 4,786,164 | 11/1988 | Kawata | 356/14 |
| 4,792,907 | 12/1988 | Ikeda | 364/449 |
| 4,803,488 | 2/1989 | Dombrowski | 340/903 |

*Primary Examiner*—Jin F. Ng
*Assistant Examiner*—Brent A. Swarthout

[57] ABSTRACT

A device and method to avoid collisions is described herein.

The invention is primarily directed to preventing tailgating by motorists. The method and device may also be utilized to detect stationary objects and to alert the driver of a vehicle of an imminent collision.

23 Claims, 1 Drawing Sheet

SAFE TRAILING DISTANCE WARNING FOR VEHICLES

1. FIELD OF THE INVENTION.

This invention relates to a device for spacing vehicles apart through use of a signaling means.

2. DESCRIPTION OF THE ART

It is known from U.S. Pat. No. 4,063,237 issued Dec. 13, 1977 to Nier et al that radiation may be directed between moving vehicles, and the time between the transmission and reception of waves, such as microwaves may be determined similar to radar timing to determine spacing between vehicles. King in U.S. Pat. No. 4,031,510 issued Jun. 21, 1977, describes a system for accurately detecting and registering the speed of motor vehicles or other motor-driven objects moving between two closely spaced points of detection. King includes a calibrator for adjusting the system of various spacings, between points of detection within an adjustable range and for adjusting the system to compensate for errors in speed caused by variation in reaction times of the various detectors units used to start and stop the timing in speed calculation.

It is known from U.S. Pat. No. 4,786,164 issued Nov. 22, 1988 to Kawata that a system and method for detecting an intervehicle distance to a preceding vehicle which is moving on the same lane as the vehicle, with means for radiating and sweeping an electro magnetic wave such as a laser beam toward the moving direction of the vehicle is provided, with confirmation of a lane on which the vehicle moves on the basis of a comparison of their sweep angles to reflectors located on both ends of a road on which the vehicles moves from a center axis of the vehicle's movement direction. The traffic lane on which the vehicle is moving in front of the vehicle is determined on the basis of their sweep angles of the electro magnetic wave.

Miller et al in U.S. Pat. No. 4,694,295 issued Sep. 15, 1987 describes a system in which a sequentially operated dual sensor technology is utilized. The sensor effort takes place as a photonic event. Miller utilizes his system to determine if a vehicle is in the blind spot of a forward vehicle.

U.S. Pat. No. 4,692,764 issued Sep. 8, 1987 to Bonar discloses an automatic range finder and remote control breaking system. Bonar states that a braking alarm may be activated and controlled braking proportional to the rate of change of distance with respect to time commences. Bonar does not describe a system in which the following vehicle is simply alerted by the forward vehicle and thereafter the following vehicle is manually stopped by action of the operator. Bonar's device requires that the operator of the following vehicle maintain his vehicle in good condition with regard to the sensing means in the second vehicle. As the present invention deals with the forward operator and the forward vehicle, it is not dependant upon mechanical detection failure which may go unnoticed by the operator of a following vehicle. Stated otherwise, the operator of the forward vehicle may maintain that vehicle in a safe operating condition and through the present invention, be able to warn all following vehicles when a preset distance is breached.

U.S. Pat. No. 4,084,149 issued Apr. 11, 1978, to Driver et al describes a sonar device for controlling the movement of an object such as a transport drawer for delivery of material and things under security conditions to a customer. U.S. Pat. No. 4,792,907 which was issued to Ikeda on Dec. 20, 1988 describes a vehicle navigation system under which the traveling conditions of a vehicle are detected.

None of the foregoing devices describes a situation in which a first vehicle traveling in a traffic lane which has a rearward directed detection means capable of detecting a second rear located vehicle and where there are further means in the first vehicle to alert the second vehicle of the presence of the first vehicle.

To the extent that any of the foregoing patents are relevant to the present invention, they are hereby incorporated in their entirety by reference.

SUMMARY OF THE INVENTION

The present invention describes a method for spacing vehicles comprising a first vehicle having a rear directed detection means capable of detecting a rear located second vehicle wherein the first vehicle has means capable of determining the rate at which the second vehicle is reducing the distance between the first and second vehicles, said first vehicle also having signaling means for generating a signal directed to said second vehicle when the second vehicle's velocity and/or distance relative to the first vehicle is determined to be too great to safely stop before contacting the first vehicle from the rear.

A further aspect of the present invention is a device having means for determining the distance between two vehicles, wherein the device is aimed from the rear of a first vehicle where a signal is initiated, received and read in the first vehicle, and means to signal at least one of the vehicle operators that the distance between the vehicles is at a predetermined distance.

DETAILED DESCRIPTION OF THE INVENTION

Figure 1:
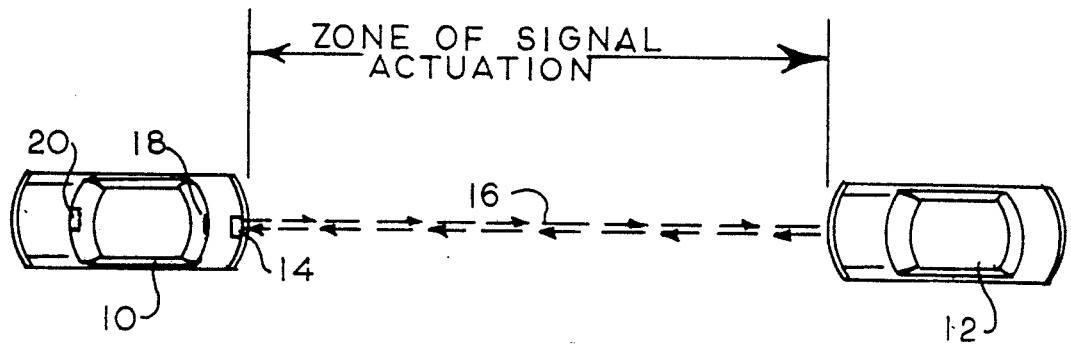
FIG. 1 shows a first vehicle 10, in a relationship to a following second vehicle 12. A signaling means 14, which is rear directed from vehicle 10 to vehicle 12 is also shown. The signal generated by the rear directed detection means 14 is shown as 16 directed to, and reflected from the rear located vehicle 12. The means for generating a warning signal from the forward vehicle 10 to the rear located vehicle 12 is shown as a center mounted tail light 18. A distance reducing rate circuit is shown mounted in the dash board of vehicle 10 as unit 20.
Figure 2:
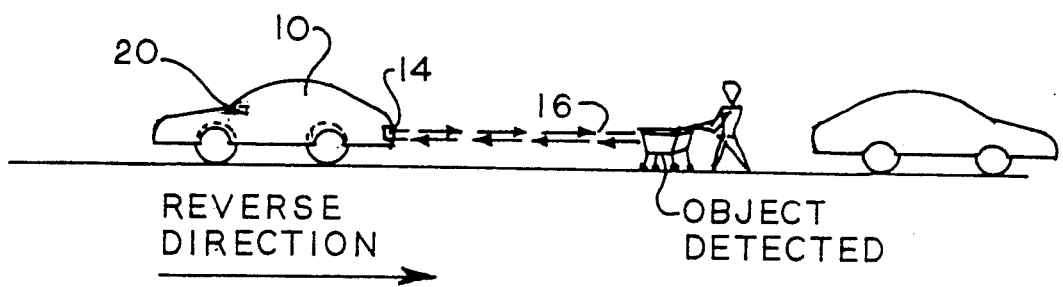
FIG. 2 shows the alternative use of the method and device of the present invention. An object such as a shopping cart is detected by vehicle 10 through the detection means 14 via the signal 16 which is reflected. The distance reducing rate circuit located in vehicle 10 warns the operator of vehicle 10 of a rear located object.

As previously stated the present invention deals with a device and method for spacing vehicles such that there is a rear directed detection means capable of detecting a rearward located second vehicle. The invention further provides that the first vehicle has means capable of determining the rate at which the second vehicle is reducing the distance between the first and second vehicles. The first vehicle also has a signaling means for generating a signal directed to the second vehicle when it is determined that the second vehicle's velocity is determined to be too great to safely stop before contacting the first vehicle in the rear. That is, if the rear vehicle continued diminishing the distance between the vehicles it would become or, is within an unsafe stopping distance.

The present invention primarily deals with motor vehicles, and in particular, passenger cars. However, the present invention is capable of being utilized for various other transport means including ships, boats, barges, airplanes, trucks, buses, and all manner of moveable vehicles.

The first particular aspect of the present invention to be discussed is the rear-directed detection means. Typically, the rear detection means will be a radar or microwave beam which is narrowly focused. The purpose for narrowly focusing the rear directed detection means is to avoid having spurious alert signals generated. A spurious signal is defined as a signal which is inapplicable to a following vehicle. An example of a spurious signal is one in which the signalling means, which are later described, is activated when there is no need for such activation. An example of such non-necessary activation would be where a following vehicle on a freeway is in a traffic lane other than that in which the forward vehicle is located. In practice, the present invention is designed to alert a tail-gating driver that that driver's vehicle is too close to safely come to a stop before contacting the first vehicle. Where the following vehicle is in a different traffic lane, there is usually a sufficient margin of error such that it is not necessary for the second vehicle to be alerted to the impending distance between that vehicle and the forward vehicle.

The present invention is primarily directed to drivers who follow too closely to a forward vehicle. Often the driver of the rearward located vehicle is unaware of a safe stopping distance. An example of a driver who is unaware of stopping distances is a newly licensed driver who does not have the physical or emotional capability of understanding the requirement for the proper spacing of vehicles. Therefore, by narrowly focusing the rear directed detection means to vehicles within a single lane it is possible to alert only those drivers who are approaching too closely. A further advantage to the system of the present invention is that one of the later described signaling means may be devised to not only alert, but to provide a negative stimulus to the driver who is following too closely. As later described, a strobe light may be utilized of sufficient intensity to provide such negative stimulus, or to alert a sleeping driver in a following vehicle of an impending collision with a forward vehicle.

While the present invention is designed to provide a narrow focus for the rear directed detection means, such is not entirely necessary, but it is desirable to prevent such spurious signals to legitimate vehicles passing the forward vehicle. Examples of the rear directed detection means include sonar, radar and laser means as well as any other means of initiating a signal for detecting the speed and location of a following vehicle. The rear directed detection means may, for example, be digital or analog.

It is also noted that a further aspect of the present invention allows a driver who is backing up such as in a crowded parking lot to be alerted to the presence of a second parked vehicle. A further aspect is to allow a driver to be alerted when approaching a loading dock that an impending collision with the loading dock is possible. The means for determining the rate at which the second vehicle is reducing the distance between the first and second vehicles may thus also tell the first vehicle when a stationary object is being approached from the rear. In the last described situation, a visible light or audible signal may be given to the operator of the first vehicle that collision with a stationary object is a distinct possibility.

The signaling means utilized herein will typically be a visible light, such as a strobe light described above. As nearly all passenger vehicles on the road today are required to have a center rear window located light to warn vehicles to the rear of a stopped vehicle, such light means is uniquely adapted to the present invention. The signaling means may also be located in a shielded area outside the vehicle to prevent or minimize snow accumlation. Thus when a vehicle from the rear approaches within the less than safe stopping distance the detection means activates a rear directed light signal to warn the rear located vehicle that it is violating the safe space of the forward located vehicle. Where Z is a safe stopping distance and X is the speed of the forward vehicle the following holds true. As the second vehicle comes closer than Z the signaling means is activated. When the following vehicle reduces its velocity to some rate less than X it will eventually increase the distance between the vehicle to Z and the signaling means will be inactivated.

A further advantage to the present invention is that the rear directed detection means for detecting a rear located vehicle and means for determining the rate at which the second vehicle is reducing the distance may be correlated to the signalling means. By being correlated to the signaling means it is meant that the rate at which the rear located vehicle is approaching the forward located vehicle will be visually indicated to the rear located vehicle. Stated otherwise, if a rear located vehicle is approaching a forward located vehicle at a velocity of X plus 30 kilometers per hour the signal generated will be intermittent directly proportional to the 30 kilometer per hour excess velocity of the rear located vehicle. As the rear located vehicle is alerted to the presence of the forward located vehicle, and begins to slow down, the signal will be reduced in direct proportion to the rate at which the velocity of the second vehicle is reducing its velocity. Therefore, as the rear located vehicle slows to a velocity of X plus 20 kilometers per hour, the signal rate will proportionally change from X plus 30 kilometers per hour to X plus 20 kilometers per hour. As an example, if the rate of velocity is X plus 30 kilometers per hour initially, the signaling means will generate 30, 60, 90, or 120 intermittent signals per minute to the rear located vehicle. As the rate of the rear located vehicle diminishes, the signal will produce 20, 40, 60, or 80 flashes of light per minute. When the rear vehicle is again within a safe stopping distance (Z) the alerting means is reset, e.g., inactivated. It is noted that the safe stopping distance is a variable and thus the means capable of determining the velocity of each vehicle may be set to calculate the safe stopping distance through the use of standard tables.

It is desirable that the signaling means not generate a continuous light signal to a rear located vehicle, as this is not as effective in gaining the attention of the operator of the rear located vehicle as an intermittent signal. However, if it is desired, the signaling means can be set to provide a steady state signal to the rear located vehicle. It is also possible for the forward vehicle to be set to provide various types of signals to the rear located vehicle depending on the distance or velocity of the rear located vehicle. An example of such variable signal means includes utilizing on a standard automobile the center light to first warn the rear operated vehicle and secondly to utilize the standard brake or backup lights as a secondary signaling system. Thus if the vehicle is not first warned by the center located light, the tail lights of the forward vehicle may be activated in unison or separately to generate a further auxilliary signal e.g. one or more distinct signals.

It is also possible to utilize as signaling means an audible signal to the rear located vehicle. However, an audible signal may not be heard by the operator of the rear located vehicle given standard freeway driving conditions. Thus the preferred means is a visible light generated as previously described above.

The signaling means may of course be inactivated when the actual velocity of the first vehicle or the second vehicle is less than a predetermined rate. Thus where the first and second vehicles are driving in city traffic, it may be desirable to have a sensing means which inactivates the signaling means. Therefore, if it is desired, the first vehicle's signaling means may be set such that it will not be activated when the following vehicle is proceding at a speed of less than 10 or 20 kilometers per hour.

A further aspect herein in where the detection means is pulsed. By pulsed, it is meant that the detection means is intermittent and does not operate on a continuum. Thus the detection means may be set such that the frequency operates every few seconds. Of course, the interval between operation of the detection means should not be such that a rear located vehicle will approach too close to the forward vehicle before the detection means activates the means capable of determining the rate at which the second vehicle is reducing the distance between the two vehicles. Of course, once the rear directed detection means has locked on to a rear located vehicle which is not within a safe stopping distance, the system should operate continuously to provide warning to the rear located vehicle.

A further aspect of the present invention is where the rear directed detection means has a second signaling means to signal the operator of the first vehicle that a collision is imminent. Thus if the operator of the rear located vehicle ignores or is unaware of the signaling means, and a predetermined distance between the vehicles is observed by the detection means, then the operator of the forward located vehicle will be warned that a deviation in traffic lane is warranted by the forward located vehicle in order to avoid the collision. Where the second vehicle is operated by a chronic tail gater, an override is allowed in the present system such that the operator of the first vehicle is not irritated by the signaling means or at least not any more aggravated than by having the tail gater in the rear located position.

As previously described, the present invention also allows the operator of the first vehicle to determine if a stationary rearward located object is likely to be contacted by the forward vehicle. This detection means may be the same as the first detection means, or may employ a second detection means. A second signaling means is designed to signal the operator of the first vehicle when a stationary object is encountered. The stationary objects may also include relatively non stationary objects such as pedestrians or rolling grocery carts. The second detection means may be set to be activated only when the vehicle is in a reverse gear. The second detection means may utilize the same signaling means as described above with regard to an imminent collision. It is also possible to utilize two signaling means, one for vehicles approaching from the rear and the second for stationary or relatively stationary objects.

It is also desirable herein when utilizing the second detection means that the first detection means not be inactivated. Of course, if it is preferred, the first detection means may be rendered inoperative when the second detection means is utilized. The reason why it is desirable to have both detection means capable of working at the same time is that in a parking lot it is possible that the operator of the first vehicle will want to be warned of stationary objects and also of relatively high velocity traffic such as another automobile. A further facet of the present invention is that the second detection means may be set to operate on a wider signal width than the first detection means. Such a wider signal width facilitates backing a vehicle out of a parking space where the operator of the first vehicle desires to be warned of a side collision with a stationary object. It is of course possible to widen a signal of the first detection means to accomplish avoidance of other vehicles. In practice, it may be desirable to have the second detection means operate only at distances of less than 10 meters. The arbitrary distance of 10 meters is set as it is unlikely that the first vehicle when in reverse gear will need to be warned of distances of greater than 10 meters.

The foregoing is particulary applicable to an automobile backing out of a parking space in a super market or mall area. However, when the detection means of the present invention are employed with a semi trailer truck it will be desirable to have the second detection means operate at all distances including those infinitely small to provide an accurate warning of the distance to a loading dock. Of course, the warning means for the second detection means may be an audible signal including one such as a voice, bell, buzzer or the like which alerts the operator of a semi trailer truck of the actual distance between the rear of the trailer and the loading dock. The warning means to the operator may be set to give a pulsed response that varies with the distance to the object which is detected.

Having adequately and fully described the present invention it is desired that the appended claims be given their full range of equivalents and not be limited to any specific exemplifications herein.

What is claimed is:

1. A method for spacing vehicles comprising a first vehicle having a rear directed first detection means capable of detecting a rear located second vehicle wherein the first vehicle has means cable of determining the rate at which the second vehicle is reducing the distance between the first and second vehicles, said first vehicle also having signaling means for generating a signal directed to said second vehicle when the second vehicle's velocity and/or distance relative to the first vehicle is determined to be too great to safely stop before contacting the first vehicle from the rear wherein the signaling means generates a signal which is proportionately related to the velocity of the second vehicle, provided further that the signaling means is inactivated when the velocity of the first vehicle or the second vehicle is less than a predetermined rate.

2. The method of claim 1 wherein the signal is a visible light.

3. The method of claim 1 wherein the signaling means may be overridden when the distance between the first and second vehicles exceeds a predetermined distance.

4. The method of claim 1 wherein the detection means utilizes a laser.

5. The method of claim 1 wherein the detection means operates in the radio frequency range.

6. The method of claim 1 wherein the detection means is pulsed.

7. The method of claim 1 wherein the signal is audible.

8. The method of claim 1 wherein the signal is visible light pulsed proportionately related to the velocity of the second vehicle.

9. The method of claim 1 wherein the signaling means is mounted in the rear window or a shielded area of a land vehicle.

10. The method of claim 1 wherein the vehicle is an automobile.

11. The method of claim 1 wherein the rear directed detection means has a second signaling means to signal the operator of the first vehicle when operating in a reverse direction of rearward located objects, further including a second detection means in the first vehicle for detecting objects within a predetermined range of the first vehicle.

12. The method of claim 11 wherein the second detection means operates at a wider signal width than the first detection means.

13. The method of claim 11 wherein the second detection means operates only at distances of less than ten meters.

14. The method of claim 11 wherein the first detection means and second detection means are capable of operating simultaneously.

15. The method of claim 1 wherein the second vehicle has means capable of receiving the signal from the first vehicle.

16. The method of claim 1 wherein the signal is one or more distinct signals.

17. A device having means for determining the distance or relative velocity between two vehicles, wherein the device is aimed from the rear of a first vehicle where a signal is initiated, received and read in the first vehicle, and means to provide a second signal to at least one of the vehicle operators that the distance between the vehicles is at a predetermined distance wherein the second signal is pulsed proportionately related to the velocity of the second vehicle, provided further that the means to provide the second signal is inactivated when the velocity of the first vehicle or the second vehicle is less than a predetermined rate.

18. The device of claim 17 wherein the signal initiated is a laser.

19. The device of claim 17 wherein the second signal is directed to a rear located vehicle.

20. The device of claim 17 wherein the signal initiated is a radio frequency signal.

21. The device of claim 17 wherein the second signal is a visible light.

22. The device of claim 17 wherein the means to signal is mounted in the rear window or in a shielded recess of a land vehicle.

23. The device of claim 17 wherein the means for determining the distance between two vehicles has a second means to signal the operator of the first vehicle when operating in a reverse direction of rearward located objects.

* * * * *